United States Patent [19]
Zipf

[11] Patent Number: 5,263,865
[45] Date of Patent: Nov. 23, 1993

[54] PERSONAL LEARNING SYSTEM

[75] Inventor: Jack E. Zipf, Hilliard, Ohio

[73] Assignee: AT&T Bell Laboratories, Murray Hill, N.J.

[21] Appl. No.: 801,219

[22] Filed: Dec. 2, 1991

[51] Int. Cl.$^5$ .............................................. G09B 5/00
[52] U.S. Cl. .................... 434/309; 434/317; 206/45.11; 206/387
[58] Field of Search ............... 434/309, 308, 317, 316; 206/45.11, 45.18, 45.24, 387

[56] References Cited

U.S. PATENT DOCUMENTS

| | | | |
|---|---|---|---|
| 3,641,684 | 2/1972 | Paige | 206/387 X |
| 3,896,929 | 7/1975 | Mills | 206/387 |
| 4,002,355 | 1/1977 | Sendor | 206/387 X |
| 4,004,689 | 1/1977 | Glasell | 434/317 X |
| 4,255,872 | 3/1981 | Williams, Sr. | 434/308 |
| 4,512,603 | 4/1985 | Williams | 294/137 |
| 4,739,960 | 4/1988 | Adler | 248/453 |
| 4,880,327 | 11/1989 | Sanabria | 402/73 |
| 4,957,261 | 9/1990 | Cirami | 248/454 |
| 5,022,522 | 6/1991 | Kennedy | 206/387 |
| 5,029,798 | 7/1991 | Clark | 248/459 |
| 5,035,393 | 7/1991 | Menaged | 248/456 |
| 5,054,736 | 10/1991 | Champoux | 248/444 |

FOREIGN PATENT DOCUMENTS

| | | | |
|---|---|---|---|
| 1528086 | 4/1968 | France | 206/45.24 |
| 2305923 | 10/1976 | France | 206/387 |
| 2543516 | 10/1984 | France | 206/387 |

*Primary Examiner*—Gene Mancene
*Assistant Examiner*—Jeffrey A. Smith
*Attorney, Agent, or Firm*—Dwight A. Marshall

[57] ABSTRACT

A personal learning system comprising a base structure with a base member for mounting a pair of training manuals and audio/visual apparatus having prerecorded instructional information for instructing a student in use of training manual course material. The base member has a back portion expandable outward from the base member to support the base member in an easel configuration with the training manuals in an open position for enabling the student to study the training manual course material in accordance with the prerecorded instructional information. A top structure normally encloses the base structure to protect the training manuals and audio/visual apparatus and is opened and positioned against the base member back portion to aid in supporting the base structure in the easel configuration.

4 Claims, 3 Drawing Sheets

PERSONAL LEARNING SYSTEM

TECHNICAL FIELD

The invention relates to apparatus of a personal learning system for use in training students in a variety of subjects.

BACKGROUND AND PROBLEM

Modern technology requires highly trained craft personnel to modify, maintain and operate complex technical electrical and electronic equipment. Changes and modifications are oftentimes made to the equipment requiring that craft personnel, such as repair personnel and operators, be retrained to modify and to maintain and operate the modified equipment. Training may be accomplished by sending the craft personnel to training courses taught by highly trained professional instructors or by requiring the craft personnel to take correspondence courses.

A problem arises in that requiring the craft personnel to attend training courses means that craft personnel are required to take time from their normal work functions to attend a formal training course. Another problem arises in correspondence courses in that craft personnel do not have the advantage provided by formal training courses of having an instructor clarify textbook material.

SOLUTION

The foregoing problems are solved by a personal learning system comprising a base structure having a generally rectangularly configured base member formed for mounting training manuals therein and for supporting and maintaining each mounted training manual with the pages thereof in an open position. The base member is further configured to mount audio/visual apparatus storing prerecorded instructional information for instructing a student in use of training manual course material. A back portion attached to one edge of the base and rotatable with respect thereto is expandable outward from the base member so as to support the base structure in an easel configuration with the training manuals in the open position for enabling the student to study the training manuals course material in accordance with the prerecorded instructional information generated by the audio/visual apparatus. A top structure normally encloses the base member to protect the training manuals and audio/visual apparatus and which may be opened and positioned against the base back portion to aid in supporting the base structure in the easel configuration. The top structure is formed with a storage cavity configured for storing audio apparatus and cabling for coupling the audio apparatus with the audio/visual apparatus to reproduce an audio portion of the prerecorded instructional information. Cassette modular cavities formed in the base and top structure hold cassettes that store prerecorded audio and/or instructional information for instructing the student in explanation and applications of the training manual course material.

DETAILED DESCRIPTION

Figure 1:
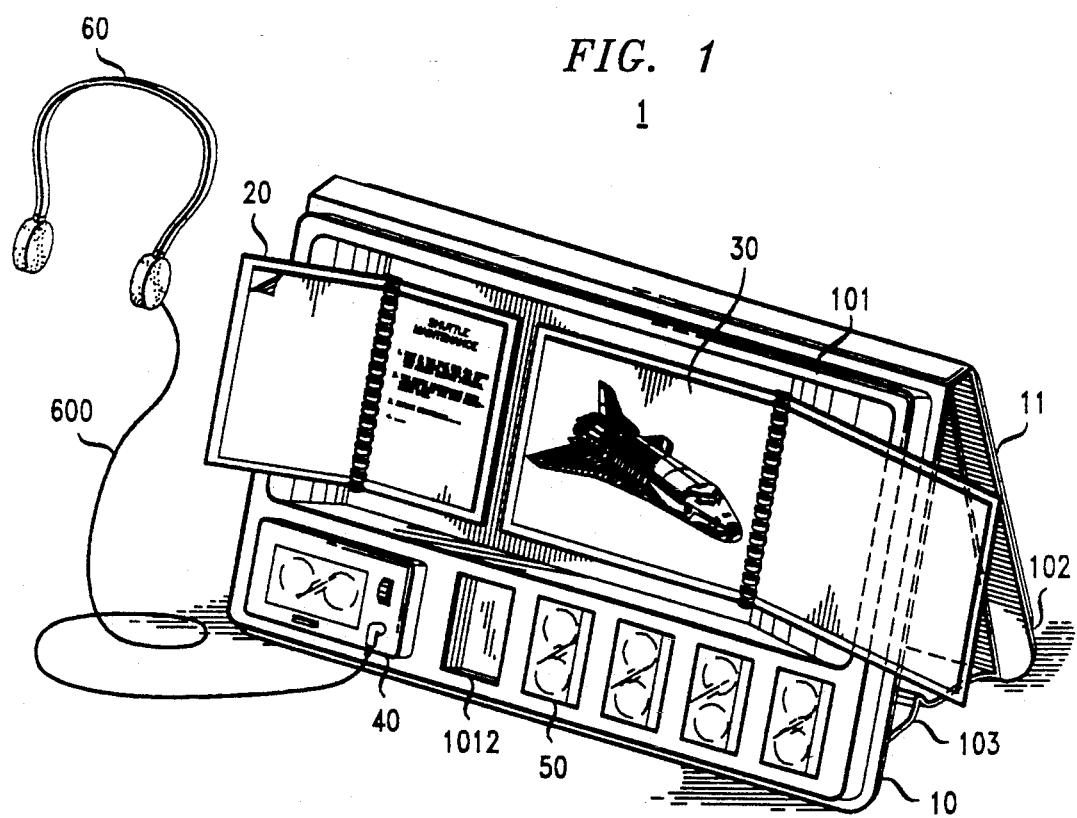
FIG. 1 is an oblique view of a personal learning system embodying the principles of the invention.

In an exemplary embodiment of the invention, personal learning system 1 set forth in FIG. 1 of the drawing is intended to provide training and educational courses to users and students. Each course has instructional manuals, such as training manuals 20, 30, which may be a text, diagram and schematic manuals, or combinations thereof, that are used to educate and train users and students. Such material may be traditional education courses, such as math, history and similar type of education courses, or may be technical courses intended for use in training craft personnel to install, modify, repair and operate various types of equipment such as computers, electrical and electronic equipment. Thus, training manuals 20, 30 may include a wide range of training materials and are identical to textbooks used in instructing students enrolled in formal training courses.

Personal learning system 1 also comprises audio/visual apparatus 40 which may include, but is not limited thereto, tape and video cassette players and the combination thereof. Cassettes 50 which may be tape, optical and solid state devices are used to store prerecorded audio and video instructional information to instruct the student in applications of the training manual course material. Such prerecorded information is lecture material that would normally be given by an instructor or tutor to students attending a formal class and supplements the training manual material. Personal learning system 1 also includes audio apparatus, such as headset 60, which can be connected by cable 600 to audio/video equipment 40. Audio/visual apparatus 40 may also be connected by cable 600 to external video monitors and computers to enable a student to use prerecorded information relating to the course material. In operation, a student would open training manuals 20, 30, select an appropriate cassette 50 and insert the selected cassette 50 into audio/visual apparatus 40. The student couples headset 60 by cable 600 to audio/visual apparatus 40 and proceeds to study the training course material in accordance with the lecture material prerecorded on cassette 50.

As set forth in FIG. 1 of the drawing, personal learning system 1 has a base structure 10 with a base member 101 for mounting a pair of training manuals 20, 30 and audio/visual apparatus 40. Although the drawing illustrates a pair of training manuals 20, 30, it is to be understood that personal learning system 1 may only have one training manual, such as either training manual 20 or 30. Base member 101 has a back portion 102 expandable outward from base member 101 to support base member 101 in an easel configuration with training manuals 20, 30 in an open position for enabling the student to study the training manuals course material in accordance with the instructional information prerecorded on cassettes 50. Back portion 102 is attached to the upper part of base member 101 and is constrained by web 103 to normally lie flat against the back of base member 101. The bottom edge may be expanded outward from base member 101 to form the easel configuration to maintain training manuals 20, 30 at an angle to permit the student to study the training manual course material. Top structure 11 normally encloses base structure 10 to protect training manuals 20, 30 and audio/visual apparatus 40. To initiate a study session, top structure 11 is opened and positioned against base member 101 to aid in supporting base structure 10 in the easel configuration. Training manuals 20, 30 are opened, the appropriate cassette 50 inserted into audio/visual apparatus 40 and headset 60 connected by cable 600 thereto.

Figure 2:
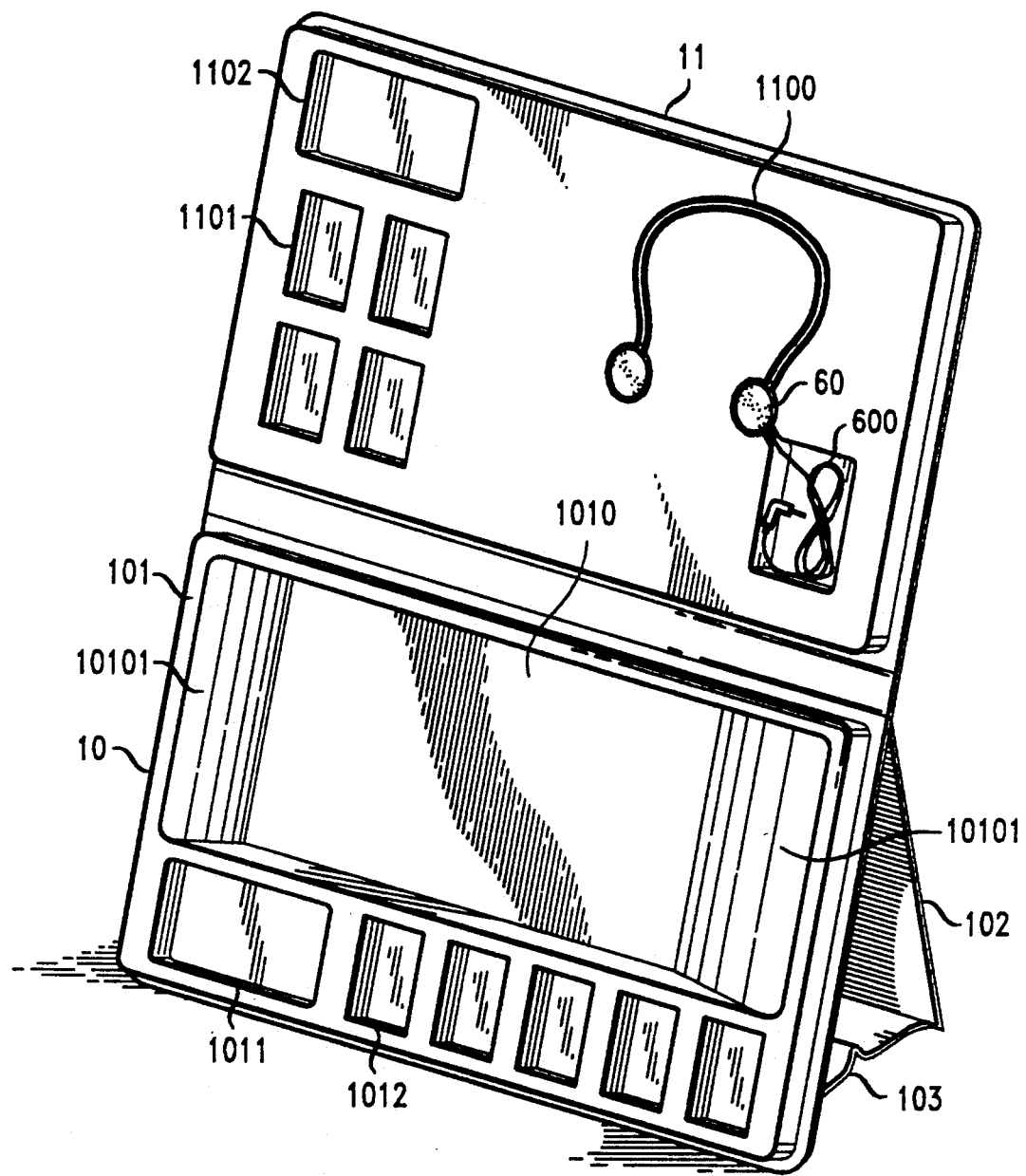
FIG. 2 illustrates one embodiment of the personal learning system set forth in FIG. 1 for mounting a pair of training manuals and audio/visual apparatus for generating prerecorded instructional information for instructing a student in use of the training manual course material.

Base member 101, FIG. 2, has a generally rectangularly configured structure with a rectangular cavity 1010 formed in the surface thereof for mounting training manuals 20, 30. In a first embodiment, rectangular mounting cavity 1010 has opposing sides 10101 formed at angles with respect to the base structure surface for supporting each training manual 20, 30 with the pages thereof in an open position. The opposing sides 10101 may be inclined at different angles with respect to mounting cavity 1010 so as to support a variety of different types of training manuals 20, 30 such that each training manual will remain open at the pages selected by the student. Another cavity 1011 is formed in the surface of base member 101 for mounting audio/visual apparatus 40 therein.

Figure 3:
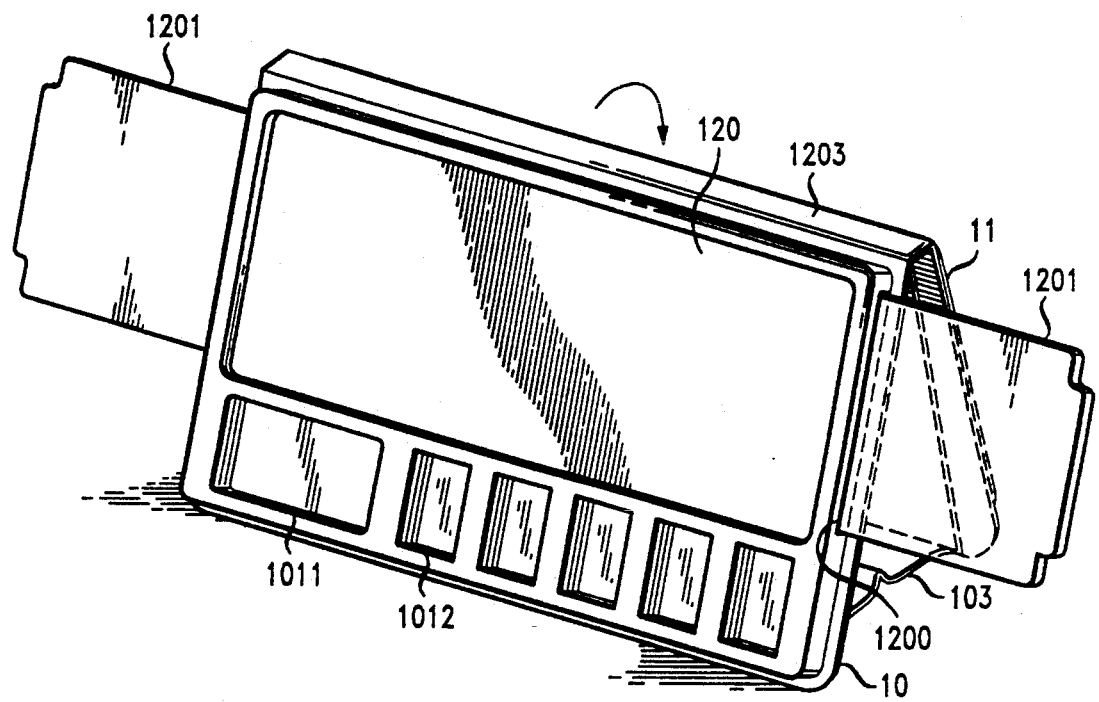
FIG. 3 illustrates another embodiment of the personal learning system set forth in FIG. 1 for mounting a pair of training manuals and the audio/visual apparatus.

In another embodiment of the invention, FIG. 3, base member 101 has a generally rectangularly configured structure with a rectangular cavity 120 formed in the surface thereof for mounting training manuals 20, 30 therein. A pair of slots 1200 are formed in opposing sides of base member 101 with each slot normally containing an extendible member 1201. The pair of members 1201 are each extendible from opposite sides of base member 101 to cooperate with rectangular cavity 120 to support pages of training manuals 20, 30 in an open position when mounted in cavity 120. As earlier set forth, cavity 1011 is formed in the surface of base member 101 for mounting audio/visual apparatus 40.

Both of the embodiments of personal learning system 1, FIGS. 2 and 3, have a plurality of cassette modular cavities 1012 formed in the surface of base member 101 for holding cassettes 50, FIG. 1. Instructional information is prerecorded on each cassette 50 mounted in modular cavities 1012 and is intended for use with audio/visual apparatus 40 in conjunction with base member 101 mounted training manuals 20, 30 for instruction of the student.

Figure 4:
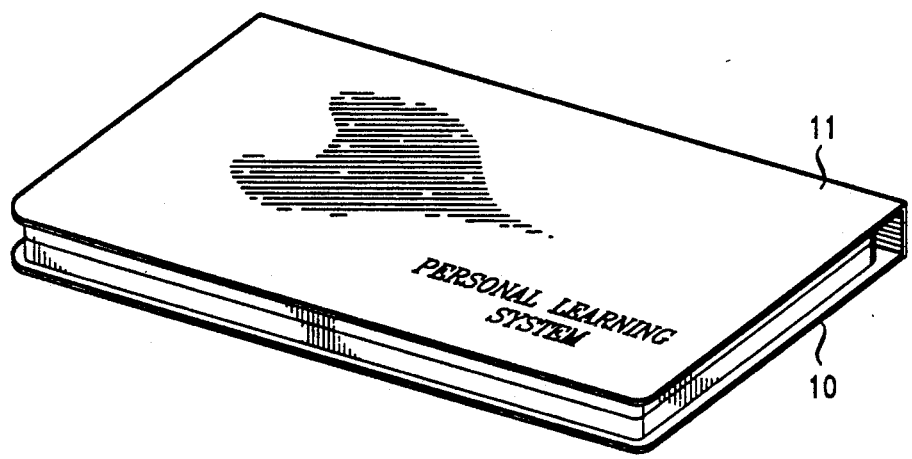
FIG. 4 illustrates the personal learning system set forth in FIGS. 1, 2 and 3 with a top structure positioned adjacent a base member to form a closed structure for shipping the system to a student.

A storage cavity 1100, FIG. 2, is formed in the surface of top structure 11 and is configured for storing audio apparatus 60, FIG. 1, and cabling 600 intended for coupling audio apparatus 60 with audio/visual apparatus 40 to reproduce an audio portion of the instructional information prerecorded on cassettes 50. Additional cassette modular cavities 1101, FIG. 2, may be formed in the surface of top structure 11 for holding supplemental ones of cassettes 50. Top structure 11, FIG. 3, is attached to base member 101 by structure 1203 and normally enclosed base member 101, FIG. 4, to protect training manuals 20, 30 and audio/visual apparatus 40. Structure 1203, FIG. 3, enables top structure 11 to rotate so that top structure 11 may be opened and positioned against the base back portion 102 to aid in supporting the base structure 10 in the easel configuration.

It is obvious from the foregoing that the facility, economy and efficiency of training students and craft personnel may be substantially enhanced by the instant personal learning system for providing prerecorded lecture material that operates in combination with training manuals and textbooks to train the students and craft personnel in the manner taught by formal courses at education institutions and training organizations.

I claim:

1. A personal learning system comprising
    a base having a generally rectangularly configured structure with a first cavity formed in a surface of the base in a generally rectangular configuration and mounting a pair of training manuals therein and wherein the first cavity has opposing sides formed at inclined angles with respect to a bottom surface of said first cavity for supporting each training manual with pages thereof in an open position and having a second cavity formed in the surface of the base and mounting audio/visual apparatus therein with the audio/visual apparatus having prerecorded instructional information for instructing a student in use of training manual course material,
    a back portion attached to one edge of the base to normally lie flat against a back of the base and expandable outward from another edge of the base opposite the one edge to support the base in an easel configuration with the training manuals in an open position for enabling the student to study training manuals course material in accordance with the prerecorded instructional information, and
    a top structure normally enclosing the base to protect the training manuals and audio/visual apparatus mounted in the base and which top structure may be opened and positioned to lie against the extended base back portion to aid in supporting the base in the easel configuration.

2. A personal learning system comprising
    a base having a generally rectangularly configured structure with a first cavity formed in a surface of the base in a general rectangular configuration and mounting a pair of training manuals therein and with the base formed with a pair of slots located in opposing sides of the base wherein the slots contain extendible members each extendible from the base slots to cooperate with the first cavity for supporting pages of the training manuals in an open position and having a second cavity formed in the base surface and mounting audio/visual apparatus therein having instructional information prerecorded therein for instructing a student in use of training manual course material,
    a back portion attached to one edge of the base and constrained by a web attached to a back of the base to normally lie flat against the base back and expandable outward from another edge of the base opposite the one edge to support the base in an easel configuration with the training manuals in the open position for enabling the student to study the training manuals course material in accordance with the prerecorded instructional information, and
    a top structure normally enclosing the base with the extendible members recessed within the base slots to protect the training manuals and audio/visual apparatus mounted in the base and which top structure may be opened and positioned against the extended base back portion to aid in supporting the base in the easel configuration.

3. The personal learning system set forth in claim 1 or 2 wherein said base and top structure comprises a plurality of cassette modular cavities formed in the surface of the base and top structure for holding cassettes having the instructional information prerecorded therein and which cassettes are intended for use with the audio/visual apparatus in conjunction with the base mounted training manuals for instruction of the student.

4. The personal learning system set forth in claim 3 wherein said top structure comprises a storage cavity formed in the surface of the top structure in combination with ones of the cassette modular cavities and storing audio apparatus and cabling for coupling the audio apparatus with the audio/visual apparatus to reproduce an audio portion of the prerecorded instructional information.

* * * * *